A. KURUNCZI.
DIRIGIBLE HEADLIGHT FOR VEHICLES.
APPLICATION FILED MAR. 23, 1914. RENEWED OCT. 9, 1916.
1,204,886.
Patented Nov. 14, 1916.
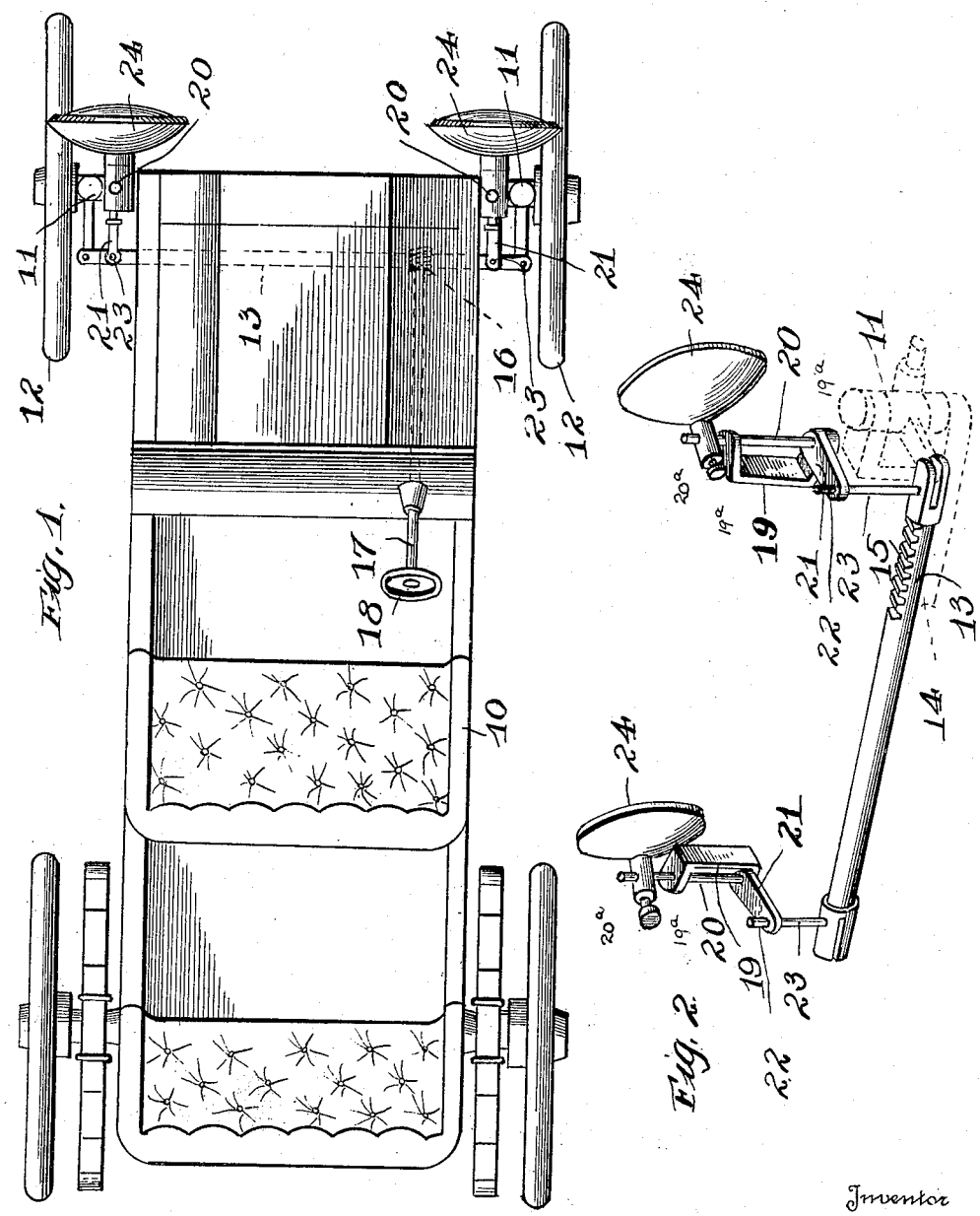
Witnesses
Inventor
Andrew Kurunczi
By A. M. Wilson
Attorney

UNITED STATES PATENT OFFICE.

ANDREW KURUNCZI, OF DETROIT, MICHIGAN, ASSIGNOR OF ONE-HALF TO JOHN MOLNAR, OF DETROIT, MICHIGAN.

DIRIGIBLE HEADLIGHT FOR VEHICLES.

1,204,886.

Specification of Letters Patent.

Patented Nov. 14, 1916.

Application filed March 23, 1914, Serial No. 826,735. Renewed October 9, 1916. Serial No. 124,685.

*To all whom it may concern:*

Be it known that I, ANDREW KURUNCZI, a subject of the King of Hungary, residing at Detroit, in the county of Wayne and State of Michigan, have invented certain new and useful Improvements in Dirigible Headlights for Vehicles, of which the following is a specification.

This invention relates to certain new and useful improvements in dirigible headlights for vehicles.

The primary object of this invention is the provision of forwardly-positioned headlights upon an automobile or other steered vehicle and in which the direction of the lamp's rays automatically shift to the intended direction of travel upon a turning of the steering mechanism for changing the vehicle's course of travel.

A further object is the provision of a connection between an automobile steering gear and pivotally-mounted forwardly positioned headlights thereon for accurately positioning the light when the vehicle is turning a curve.

A still further object of the invention is to provide an inexpensive and efficient attachment whereby headlights may be pivotally-mounted upon the vehicle and connected to the steering gear thereof in such a manner as to simultaneously turn the lamps for changing the direction of the light rays whenever the front wheels are laterally turned in the steering operation.

With these general objects in view and others that will appear as the nature of the invention is better understood, the same consists in the novel combination and arrangement of parts hereinafter fully described, illustrated in the accompanying drawings, and pointed out in the appended claim.

In the drawings forming a part of this application and in which like designating characters refer to corresponding parts throughout the several views: Figure 1 is a plan view of an automobile provided with the present invention, and, Fig. 2 is a perspective detail view of the attachment and steering rod removed from the automobile, one steering knuckle being shown in dotted lines.

Referring more in detail to the drawings, the automobile 10 is illustrated as having the steering knuckles 11 of the front wheels 12 connected together by the usual connecting rod 13 and herein illustrated as positioned rearwardly of the front axle 14. The connecting rod 13 is provided on its upper surface with rack teeth 15, and is laterally movable in the steering operation by means of the worm 16 carried by the revoluble steering post 17 and controlled by the operator of the automobile through the agency of the usual steering wheel 18.

Lamp brackets 19 are secured in any desired manner upon the front portion of the automobile, and each has a pair of perforated brackets 19$^a$ to revolubly support a post 20, the upper ends of which posts extend through vertical openings formed in arms 20$^a$ projecting from the lamps 24. The posts 20 are turned by means of a rearwardly-extending arm 21 provided adjacent its rear end with a vertical perforation 22.

The connecting rod 13 is provided with opposite stationary vertical rods 23 slidably positioned within the perforations 22 of the rearwardly-extending arms 21 so that any lateral movement of the rod 13 shifts the rods 23 and correspondingly revolves the posts 20 together with the lamps or headlights 24.

From this detailed description of the device, the complete operation thereof will be at once apparent. The forward wheels 12 of the automobile are turned either toward the right or the left by means of the steering wheel 18 and thereupon turn the headlight posts 20 and the headlights 24 in a corresponding direction, so that the rays of light are always projected forwardly in the path of travel indicated by the position of the front wheels. In this manner, the headlights are constantly turned simultaneously with each movement of the front wheels in the steering operation.

While the forms of the invention herein shown and described are what are believed to be preferable embodiments thereof, it is nevertheless to be understood that various forms and modifications may be had without departing from the spirit and scope of the invention as claimed.

What I claim as new is:—

The combination with the steering knuckle connecting rod of an automobile, of a pair of brackets each having a plurality of horizontal perforated lugs, vertical posts revolubly supported in the perforations of said lugs, lamps having centrally projecting arms each having a vertical opening to receive the upper ends of said posts, means for securing said arms to the posts, a steering post and connections between said steering post and said connecting rod, vertical rods projecting from said connecting rod, and arms connecting said vertical rods to said revoluble posts.

In testimony whereof, I affix my signature in the presence of two witnesses.

ANDREW KURUNCZI.

Witnesses:
JOHN RAVITZCF,
FVOURCH SARBO.

Copies of this patent may be obtained for five cents each, by addressing the "Commissioner of Patents, Washington, D. C."